March 10, 1964 R. W. CORNELL 3,124,190
FASTENER DEVICE

Filed March 30, 1961 2 Sheets-Sheet 1

INVENTOR
ROBERT W. CORNELL
BY *Norman Friedland*
AGENT

March 10, 1964 R. W. CORNELL 3,124,190
FASTENER DEVICE
Filed March 30, 1961 2 Sheets—Sheet 2
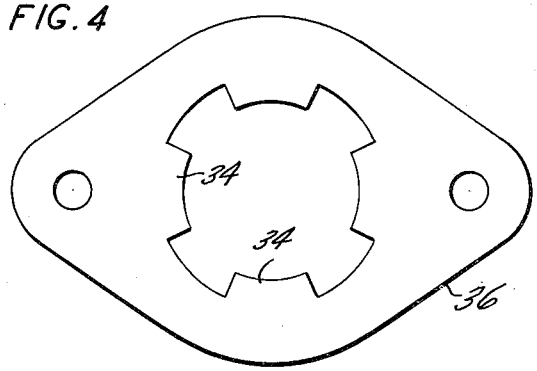
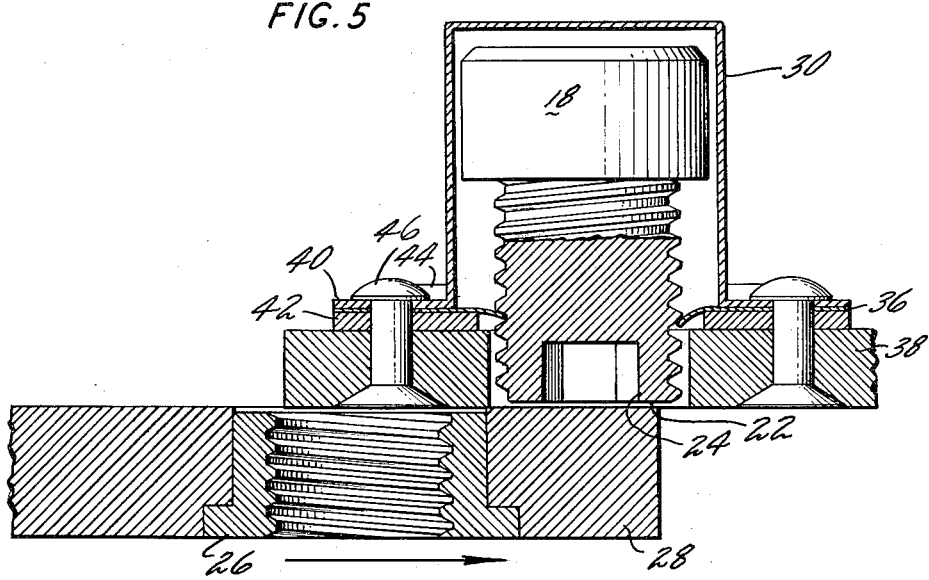
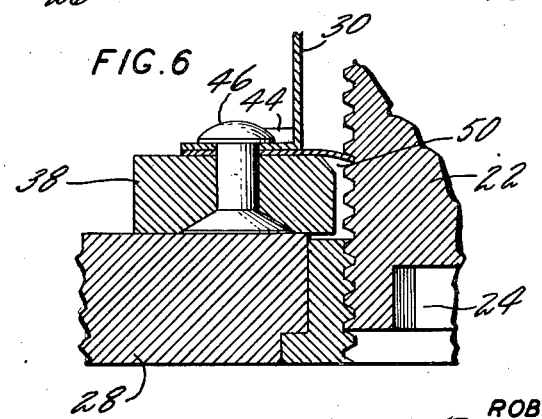
INVENTOR
ROBERT W. CORNELL
BY Norman Friedland
AGENT

United States Patent Office 3,124,190
Patented Mar. 10, 1964

3,124,190
FASTENER DEVICE
Robert W. Cornell, West Hartford, Conn., assignor to United Aircraft Corporation, East Hartford, Conn., a corporation of Delaware
Filed Mar. 30, 1961, Ser. No. 99,631
5 Claims. (Cl. 151—69)

This invention relates to a fastener and particularly to a fastener of the blind nut and bolt type and constitutes an improvement over the device disclosed in U.S. application Ser. No. 678,100, filed August 14, 1957, entitled Fastener Device, by R. A. Madsen, and assigned to the same assignee, now issued as U.S. Patent No. 2,992,685.

An object of this invention is a fastener which is self-contained so that the component parts are retained upon unfastening.

A further object is a fastener in which a shim-nut is employed to engage the thread of a screw, to hold and align the screw when in an unfastened position, to serve as a guide for the screw, and to load the screw when in the fastened position.

It still is a further object to provide a blind screw nut fastener which is characterized as being simple in construction, lightweight, relatively inexpensive to manufacture, and containing few components parts.

It still is a further object of this invention to provide a cap surrounding the head portion of the screw for guiding the screw in position.

Other features and advantages will be apparent from the specification and claims and from the accompanying drawings which illustrate an embodiment of the invention.

FIG. 4 is a plan view of the shim-nut.

FIG. 5 is a sectional view identical to FIG. 2 when the fastener is retracted.

FIG. 6 is a partial sectional view showing a modification of the present invention.

Figure 1:
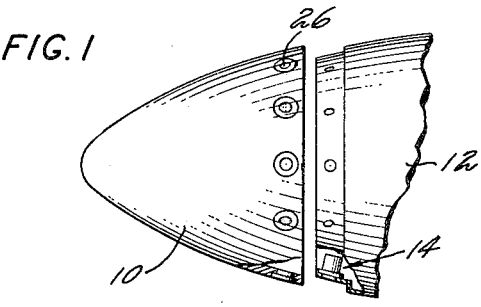
FIG. 1 is a schematic illustration of a spinner utilizing this invention.

As was described in the referenced Madsen's application, to assure an aerodynamic clean surface in a spinner adapted for an airplane propeller, it is necessary that no protrusions extend beyond the spinner skin. Thus fasteners, as disclosed in the referenced Madsen application, heretofore, have been devised to satisfy this requirement. However, these heretofore fastener types have been expensive and comprised of many component parts. Although by no way intended to be a limitation therefor, this device which constitutes an improvement over the prior fasteners finds utility particularly for spinner application and is used to fasten the nose section of the spinner to the rear section. In this manner the nose section can be removed so that a mechanic may get at the inner portion of the propeller working mechanism to perform mechanical adjustments and the like. As is shown in FIG. 1, a spinner having a front nose and rear section is schematically illustrated showing the nose 10 retracted from the rear section 12, illustrating a plurality of fasteners 14 circumferentially mounted around the inner periphery of the rear section. As is shown in FIG. 1, when the screw of the fastener is in the retracted position, the front nose section is capable of sliding over the rear nose section so that the cooperating nut portion, shown generally at numeral 26, can be aligned with the screw of the fastener. The screw is accessible from the outer surface of the spinner, facilitating disassembly.

Referring more particularly to FIGS. 2–5 inclusive, the fastener is shown as comprised of a screw 18 having a cylindrical head portion 20 and threaded shank portion 22. Provided on the anti-head portion of the screw is a recess 24 which is capable of receiving a tool adapted for turning the screw. A mating nut 26 is secured in the working element 28 and may be permanently secured in position by either frictional fit, weld, brazing, etc. With certain materials, taping the thread directly in the working element may be feasible. A cap 30 is provided and surrounds the head of the screw and serves to guide the screw forward in engagement with the nut and also serves to prevent foreign matter from getting into the working elements. A vent 32 may be provided to equalize the pressure in the chamber formed by the cap 30. Also the depth of the cap is sufficient so that the screw, when retracted, does not become disengaged from the tangs 34 of the shim-nut and yet permits the end of the screw 22 to sit inwardly of the end surface of element 38. This serves to allow working elements 28 and 38 to slide with respect to each other when the fastener is unfastened. The cylindrical cap 30 may be made from a suitable thin stock and carries on its lower end flange 40. A spacer 42 is interposed between the working element and flange 40 and carries a plurality of tangs 44 which are bent over the flange 40 of cap 30 for securing it thereto. A shim-nut 36 is interposed between spacer 42 and flange 40 and each member carries a cooperating aligned opening for receiving a rivet 46 for securing the assembly to the working element 38. A central opening is provided to receive the shank of the screw.

The shim-nut surrounds the shank of the screw and is made from spring stock and comprises a plurality of tangs formed on its inner diameter which engage the thread of the shank portion of the screw. The shim-nut, in its preferred form, is designed to carry 3 or 4 tangs which form a thread therein. It is to be understood that the shim-nut may carry any number of tangs.

As was noted above, the shim-nut serves to hold the threaded shank of the screw in position and facilitates aligning the screw with its mating nut particularly when the screw is disengaged from nut 26. In this manner a mechanic can easily secure the working elements to each other regardless of the attitude of the mechanism. When the screw is tightened, the underneath portion of the shoulder formed by the cylinder head 20 engages the tangs 34 and holds the screw against rotation with respect to the nut when fastened. As shown in FIG. 5, working element 28 is positioned away from its mating element 38, and the nut 18 is constrained in its retracted position so that there is no chance of the screw dislodging in the event of loosening. It is apparent, as shown in the drawing, that the screw is held from protruding beyond element 38 so that there is no interference when assembling of the two working elements. To fasten the two elements with respect to each other, the working elements are aligned and a suitable tool is inserted through an opening formed in the nut and engages with the recess formed at the anti-head portion of the screw. The screw is then screwed downwardly until the shoulder formed at the bottom of the head of the screw engages the tangs of the shim-nut 36. Further tightening assures that the screw is loaded for holding it in position against adverse forces such as vibration.

While the spacer 42 affords certain advantages, particularly securing the shim-nut to the cap, providing a washer for the head of the screw, and providing good control, the spacer may be eliminated as shown in FIG. 6. In the modification shown in FIG. 6, the working element 38 may be counterbored or countersunk to provide a cavity 50 so that the shim-nut has sufficient room to deflect.

Figure 2:
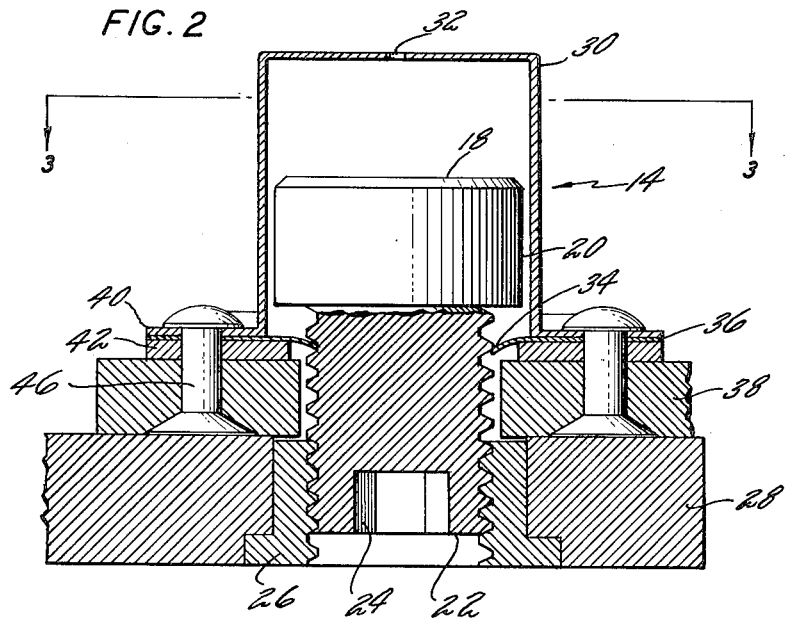
FIG. 2 is an enlarged vertical sectional view taken along the line 2—2 of FIG. 3.
Figure 3:
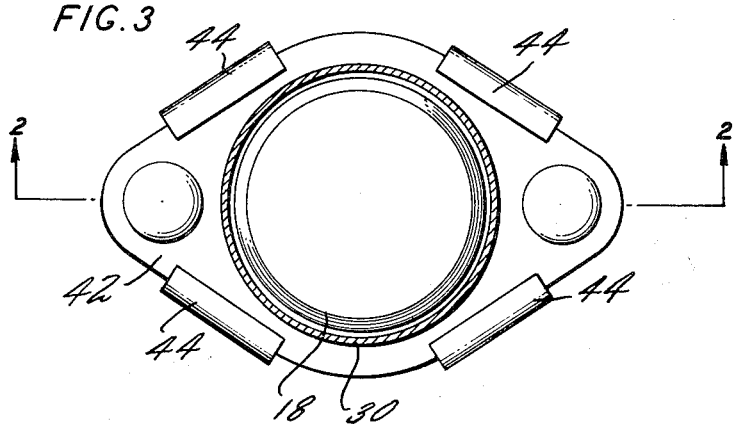
FIG. 3 is a view taken along 3—3 of FIG. 2.

It will be noted as viewed in FIG. 2 that the underneath portion of the head overlies at its outer periphery the inner periphery of the spacer 46. In the modification viewed in FIG. 6, the counterbore or countersink of the element 38 is designed so that the head will overlie the flat surface of the working element. In both instances, this is desirable so that the head bears against the spacer or working element when in the full fastened position.

What has been shown by this invention is a blind screw nut fastener which is characterized as being simple in construction containing few component parts and inexpensive to manufacture. The members of the fastener are retained in the working elements so that the possibility of parts being lost or ingested into the engine in the event of loosening of the screw, is prevented. Fastening may be equally facilitated regardless of the attitude of the device.

It is to be understood that the invention is not limited to the specific embodiment herein illustrated and described, but may be used in other ways without departure from its spirit as defined by the following claims.

I claim:

1. A fastener device including two elements to be held together, one of said elements provided with an opening, a retractable screw having an enlarged head and a shank, said shank having threads extending to said head, said screw shank extending through said opening, a shim-nut formed from a flexible material surrounding said opening, said shim-nut having a body and inwardly extending, circumferentially spaced tangs formed around the inner diameter of the shim-nut and engaged with the threads of said screw during the full movement of said screw, a tubular cap member secured to said one element, said screw head being contained within said tubular member, said tubular member including means overlying said screw head and cooperating with said screw for defining the maximum retraction of said screw, means securing said shim-nut and tubular member to said one element, said screw head overlying the body of said shim-nut, means providing a space underlying said tangs, said tangs being axially deflectable into said space, a nut carried by the other element and in a position to be engaged with the shank of said screw, tool receiving means carried on the end of the screw shank remote from said head and accessible through the opening formed in the nut for turning said screw.

2. A fastener as claimed in claim 1 wherein said space providing means is defined by an annular member surrounding said aperture and located between said shim and one of said elements.

3. A fastener as claimed in claim 1 wherein said space providing means is defined by a bore formed around the outer periphery of said aperture and extending laterally a sufficient distance to receive said spaced tangs when deflected.

4. A fastener device including two elements to be held together, one of said elements provided with an opening, a retractable screw having an enlarged head and a shank, said shank having threads extending to said head, said screw shank extending through said opening, a shim-nut formed from a flexible material surrounding said opening, said shim-nut having a body and inwardly extending, circumferentially spaced tangs formed around the inner diameter of the shim-nut and permitting engagement with the threads of said shank during the full movement of said screw, a cap member secured to said one element, said screw head being contained within said cap member, said cap member including means overlying said screw head and cooperating with said screw for defining the maximum retraction of said screw, means securing said shim-nut and cap member to said one element, said screw head overlying the body of said shim-nut, means providing a space underlying said tangs, said tangs being axially deflectable into said space, a nut carried by the other element and in a position to be engaged with the shank of said screw, externally accessible tool receiving means carried on the end of the screw shank remote from said head and accessible through the opening formed in the nut for turning said screw.

5. A fastener device including two elements to be held together, one of said elements provided with an opening, a retractable screw having a head and a shank, the diameter of said head being larger than the diameter of said shank, said shank having threads extending to said head, said shank extending through said opening, a shim-nut formed from a flexible material surrounding said opening, said shim-nut having a body and inwardly extending, circumferentially spaced axially flexible tangs formed around the inner diameter of the shim-nut and permitting engagement with said threads during the full movement of said screw, a housing having side and top wall members secured to said one element, said head being encased within said top and side members, said top member overlying said head and cooperating with said screw for defining the maximum retraction of said screw, means securing said shim-nut and housing to said one element, said head overlying the body of said shim-nut, means providing a space underlying said tangs, said tangs being axially deflectable into said space, a nut carried by the other element and in a position to be engaged with the shank of said screw, externally accessible tool receiving means carried on the end of the screw.

References Cited in the file of this patent

UNITED STATES PATENTS

| | | |
|---|---|---|
| 2,566,593 | Bloomfield | Sept. 4, 1951 |
| 2,919,736 | Kann | Jan. 5, 1960 |
| 2,929,474 | Boardman | Mar. 22, 1960 |
| 3,083,796 | Bell | Apr. 2, 1963 |

FOREIGN PATENTS

| | | |
|---|---|---|
| 828,194 | Great Britain | Feb. 17, 1960 |